United States Patent [19]

Janecek

[11] Patent Number: 4,961,862
[45] Date of Patent: Oct. 9, 1990

[54] AMENDMENT ADDITION SYSTEM AND METHOD FOR TWIN BELT PRESS FILTER

[75] Inventor: Kenneth F. Janecek, Salt Lake City, Utah

[73] Assignee: Baker Hughes, Houston, Tex.

[21] Appl. No.: 171,712

[22] Filed: Mar. 22, 1988

[51] Int. Cl.$^5$ .......................................... B01D 33/048
[52] U.S. Cl. .................................. 210/778; 210/193; 210/216; 210/386; 210/401; 210/783; 100/71; 100/118; 100/153
[58] Field of Search ............... 210/768, 770, 772, 783, 210/194, 216, 383, 386, 396, 400, 401, 751, 193, 777, 778; 100/71, 72, 118, 152, 153; 162/60, 205, 300, 301, 303, 305, 264, 8, 208

[56] References Cited

U.S. PATENT DOCUMENTS

| | | | |
|---|---|---|---|
| 3,531,404 | 9/1970 | Goodman | 210/400 |
| 3,951,809 | 4/1976 | Kollmar | 210/386 |
| 4,105,558 | 8/1978 | Heinrich et al. | 210/401 |
| 4,358,381 | 11/1982 | Takeuchi et al. | 210/770 |
| 4,417,982 | 11/1983 | Britschgi et al. | 210/386 |
| 4,559,143 | 12/1985 | Asada et al. | 210/778 |
| 4,584,936 | 4/1986 | Crandall et al. | 210/386 |
| 4,595,506 | 6/1986 | Kneer | 210/783 |
| 4,647,382 | 3/1987 | Sharpe | 210/778 |

FOREIGN PATENT DOCUMENTS

| | | | |
|---|---|---|---|
| 1070864 | 1/1980 | Canada | 210/770 |
| 111810 | 8/1980 | Japan | 210/456 |
| 191697 | 9/1985 | Japan | 210/401 |
| 283498 | 12/1986 | Japan | 210/400 |
| 2058035 | 9/1980 | United Kingdom | 210/778 |

*Primary Examiner*—Peter Hruskoci
*Assistant Examiner*—Joseph Drodge
*Attorney, Agent, or Firm*—Skjerven, Morrill, MacPherson, Franklin & Friel

[57] ABSTRACT

A twin belt filter press system has an amendment such as sawdust, fed to a sludge or slurry being dewatered after the sludge/slurry has been initially dewatered in a gravity drain section to form a cake on a first porous belt. The amendment cascades into the partially dewatered cake off the first belt, allowing mixing of the cake and amendment in an essentially belt-wide drop zone so that the amendment partially and quickly desorbs the cake before the cake and amendment mixture progresses into a nip formed by the first belt and a porous second belt. The mixture subsequently is carried in a position between the belts for pressing to remove moisture from both the cake and amendment. In one embodiment a shear-minimizing mixer is arranged in the amendment drop zone to additionally mix the amendment with the cake. In a further embodiment, additional amendment may be added downstream across the belt width between downstream rollers utilizing a plate which spreads the belts divergently forming a discrete mixing chamber therebetween. A paddle-type mixer may be provided in the mixing chamber to mix the additional amendment to partially dewatered cake and earlier fed amendment. In a further embodiment, a portion of the cake/amendment mixture after pressing may be repulped with fresh liquid and recycled upstream for effecting a displacement wash.

20 Claims, 3 Drawing Sheets

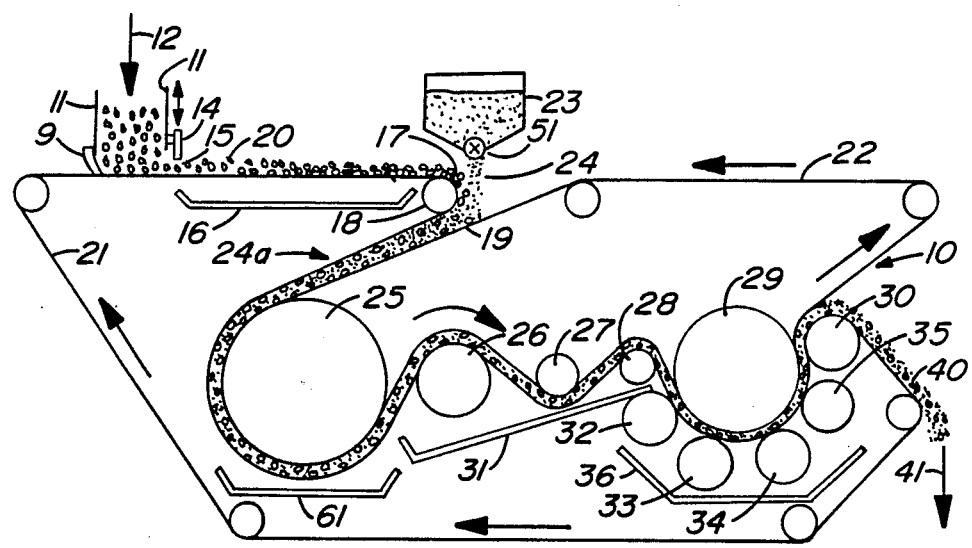
FIG._1
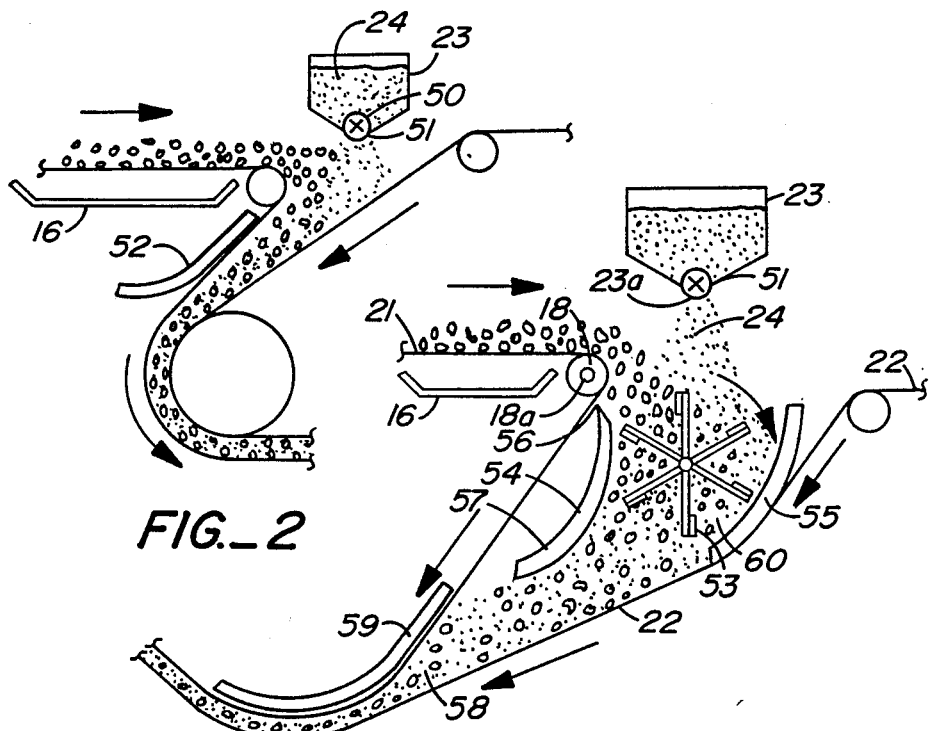
FIG._2
FIG._3

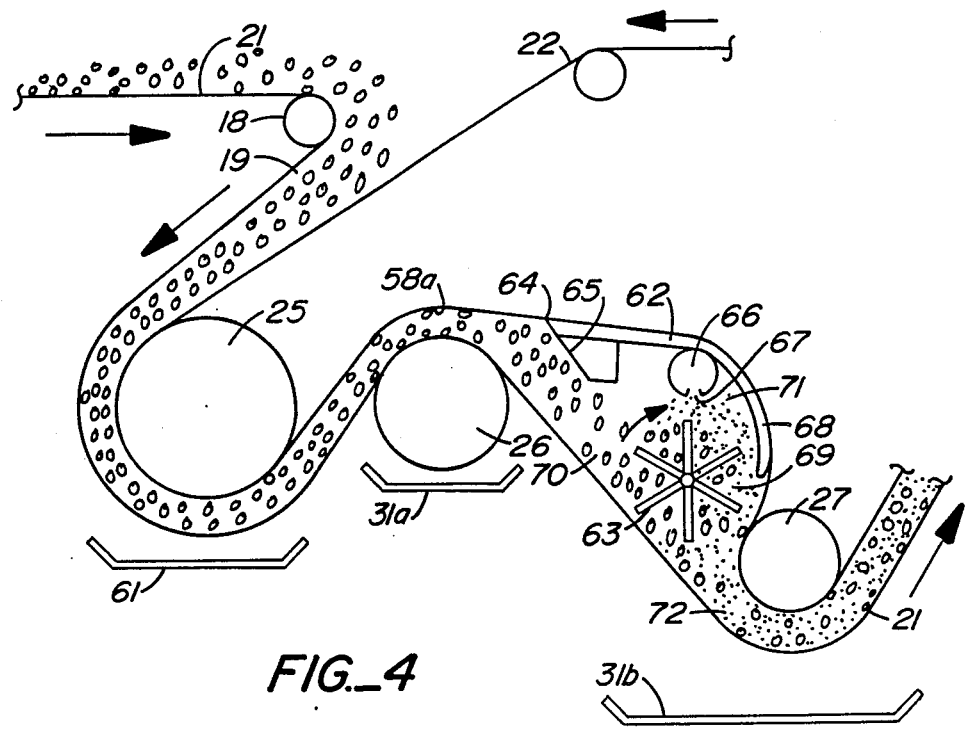
FIG._4
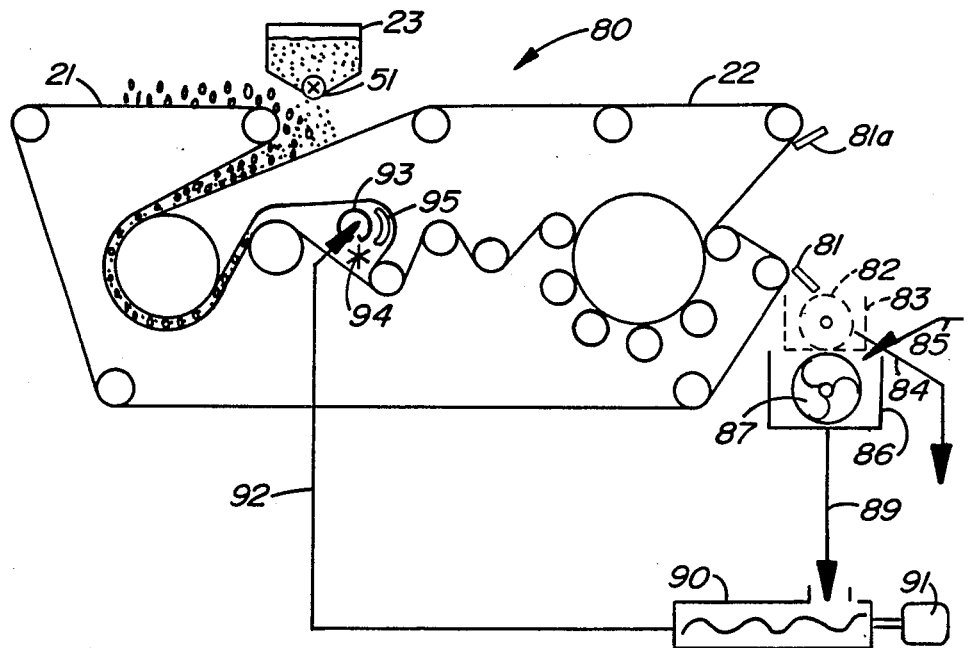
FIG._7

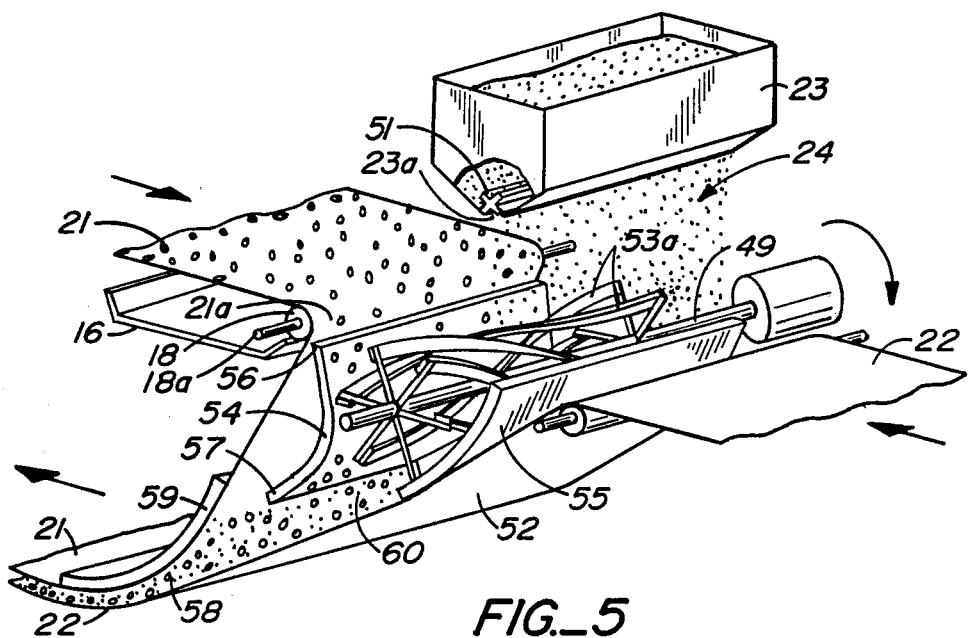
FIG._5
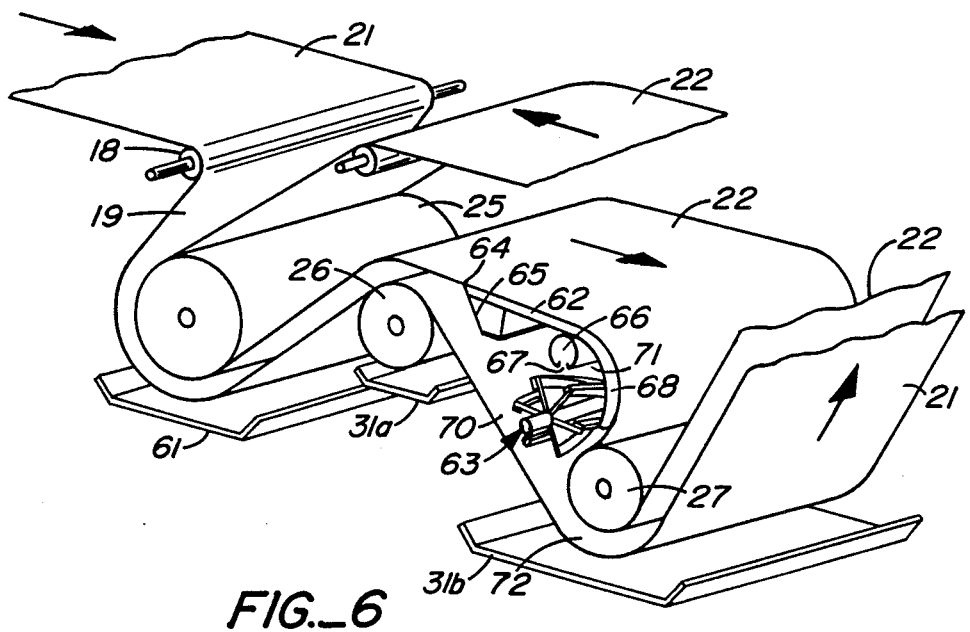
FIG._6

AMENDMENT ADDITION SYSTEM AND METHOD FOR TWIN BELT PRESS FILTER

FIELD OF THE INVENTION

This invention relates to twin belt press filters for the dewatering of sludges and slurries. More particularly it relates to means for increasing the solids content of sludge cake after gravity dewatering on one of the belts and before the partially dewatered cake is fed into the press belts.

BACKGROUND OF THE INVENTION

In operation of twin belt presses, as exemplified by U.S. Pat. No. 3,951,809, a feed of sludge or slurry having from about 1% solids to about 6% solids by weight is passed into a filter feed box and spread over the width of an essentially horizontally moving first porous filter belt. The sludge layer then passes across a gravity drain zone deck with or without stationary mechanical plows turning or mixing the sludge in the deck zone for initial dewatering, generally to an exit-the-drain zone solids content of about 10%. The resultant cake is then conveyed by the first belt by suitable roller(s) to a drop zone where the resultant partially drained slurry drops off the first belt into a wedge zone between a second (the twin) porous belt converging toward the first belt in proximity to the first belt. The dewatered slurry is sandwiched between and subsequently squeezed between the first and second belts by compressive action of four, five or even more pressure rolls or wedge plates or other pressure devices for further consolidation of the compressible sludge, i.e. removal of further liquor from the cake at various pressurizing (squeezing) stages, until the desired moisture content, i.e. % solids of the cake is obtained. One type of wedge plate includes a single typically perforated spiral-shaped slide surface mounted behind one belt to provide a slow increase in dewatering pressure as a result of tension in the two belts. Slurry, sandwiched between the two belts, travels around perforated and/or non-perforated rolls in a S-roll medium pressure section for further dewatering. After the S-roll section the twin belts travel between a main roll and a series of high pressure rolls. Compression forces are applied by the satellite rolls to the main roll by hydraulic cylinders mounted on the frame to actuate the satellite rolls pressing action. After the last pressure roll the belts separate and the cake, with typical solids content of about 30-45% for municipal biological sludge but dependent on the material and the desired moisture, is discharged from the belts by suitable scrapers. Each additional roller system and each further reduction in % solids content, increases the complexity and expense of the machine. The series of rolls are arranged in staggered configuration with progressively smaller rollers to increase the pressure on the cake and bend it in alternately opposite directions in a serpentine path, shearing the cake. Twin wire filtering machines have a normal cost of from about $50,000 to $400,000 dependent on size, designed throughput, and the particular characteristics of the sludge/slurry being treated.

It has been suggested in the past and practiced in various industries utilizing belt filters to mix dry sawdust or other amendment or absorbent into a feed slurry mixing tank to initially "soak up" or absorb some of the water or liquor in the slurry and improve the rheology of the solids for dewatering. Organic and inorganic coagulants and coagulant aids to tie up slurry fines also have been added to the mixing tank. The resultant mixture was then pumped to the feed slurry distribution box for uniform distribution onto the belt at the beginning of the gravity drain zone and an increment of liquor or water drained from the mixture as the belt moves along the length of the gravity drain zone. It has been found that the resultant cake, after proceeding over the same finite length of the gravity drain zone will be about 6-10% solids in a typical press using typical slurries with or without addition of the sawdust amendment. It is believed that this is so since the free draining of excess water in a gravity drain zone does not include bound water, nor void volume water. These latter are essentially proportional to suspended solids content whether or not amendment solids are present, i.e., sawdust solids will soak up and hold about as much water per unit weight as the original sludge solids will. This extra water associated with the sawdust is counter productive to the dewatering objectives and in general discourages the practice of adding sawdust to a belt press slurry to improve cake rheology, percent capture of fines, and cake solids.

SUMMARY OF THE INVENTION

In the present invention, it has been found that addition of "bone-dry" sawdust or other non-wetted absorbent or amendment from a second feed hopper discharging across the belt onto the already gravity-drained slurry, as the gravity drained slurry drops from the first belt inherently provides a degree of mixing of the sawdust and gravity-drained slurry before they together fall in the wedge zone between the first belt and the second moving belt. Upon addition of the sawdust, the combined solids content of the mixture of sawdust and cake becomes about 15% to 20% solids just from the stoichiometry of the mixture. The actual % solids depends on the actual discharge solids % from the drain deck, the moisture content of the amendment, and the amendment dose. In one embodiment supplemental mechanical mixing of the amendment and the gravity drained cake is provided to make a more homogeneous mixture prior to the actual entry of the mixture into the wedge between the first and second belts as the belts approach parallelism and sandwich the cake. This mixing is done with as little shearing as possible to minimize formation of fines which may plug the belt pores. As a result of the amendment addition, a stronger, more stable, higher viscosity sludge matrix is formed which will not squeeze through or out the edges of the twin belts as they convey the mixture through the successive pressure squeezing rollers and zones in the filter. This stiffer cake also results in the ability to use a shorter and less expensive wedge section for guiding the two belts into juxtaposition and a smaller first S-roll. "S" rolls are those rolls providing a serpentine belt path. A smaller first S-roll is possible since the cake with amendment entering the roll is already as dry as it normally would be after exiting the S-1 roll.

Raising the cake solids content at the wedge entry by adding amendments reduces the rheological flow properties of the mixture. The solids take on more of the superior filterability properties of the amendment, so that the cake width is stabilized. Conventional wetter cakes, with no amendment added downstream of the gravity drain zone, are very prone under even light pressure to spread out and squeeze out the sides of the belt or through the belt. As used here, "amendment" is defined as a solid material which affects the rheology of the cake by increasing the filterability of the materials mixed with the amendment. "Absorbent" as used herein means those amendments which cause wicking of water or other liquid away from the sludge or other materials being filtered into the absorbent.

In an additional embodiment of the invention, the parallel facing belts, after expression of liquor by passage over one or more sets of S-rolls, may be spread apart and the cake contained therein discharged to a second mixing zone still contained between the spread apart belts where additional or initial amendment can be mixed therewith and the new mixture subsequently fed, preferably by gravity, into the next roll as the twin belts come back together. This action, when cake rheology allows and justifies it, even more dramatically increases the % solids and stabilization of the cake. "P" rolls, are the downstream pressure rolls. As a result, further downstream nip rolls can be set at higher PLI i.e. Pounds of pressure per Linear Inch of face width across the rolls to achieve higher cake solids, or cake throughput rate can be increased, or the sawdust dose can be lowered at that point. An extra benefit would be less solids fines production and less belt blinding which would result since much less "free water" is present and there is less liquor to carry fines in any substantial amount to the media surface. The improved rheology cake captures fines better in its matrix and the improved cake discharge resulting from the better cake rheology reduces belt scraping and washing and thus improves cake capture. Recycling part of the downstream cake, including the added sawdust or other amendment, is envisioned to optimize performance. Further, it is contemplated that the present system may employ the addition and mixing downstream of a wet pulp, for example at the S-2 rolls, so that the water in the wet pulp will act as a displacement wash or leach from the pulp containing a mother liquor of economic value.

BRIEF DESCRIPTION OF THE DRAWINGS

FIG. 1 is a schematic side view of a twin belt press filter showing the apparatus of one embodiment of the invention.

FIG. 2 is a partial schematic side view of an initial cake discharge region of the filter illustrating the principal step of the method of the invention.

FIG. 3 is a partial schematic side view of the initial cake discharge region of the filter illustrating an embodiment including additional mixing apparatus for performing the principal step of the method.

FIG. 4 is a partial schematic side view of a secondary downstream cake discharge region of the filter illustrating an embodiment including one possible apparatus for adding supplemental amendment to the cake between sets of pressure rollers.

FIG. 5 is a schematic perspective view of the filter mixing portion of the FIG. 3 embodiment in the absence of sludge cake and amendment.

FIG. 6 is a schematic perspective view of the filter mixing portion of the FIG. 4 embodiment in the absence of sludge cake and amendment.

FIG. 7 is a schematic diagram showing a further embodiment of the invention illustrating recycling of the cake/amendment mixture.

DETAILED DESCRIPTION

"Dewatering" as used herein is defined as the removal of water or other liquor or liquid in liquid form from a sludge or slurry by the use of a moving belt filter.

FIG. 1 schematically shows a belt filter press 10 for dewatering of sludges or other materials. Belt filter presses are built in various configurations, are tailored to specific applications and come in a variety of sizes and materials of construction. FIG. 1 is a simplified form of a typical belt filter press having a feed box 11 for receiving the sludge or slurry indicated by arrow 12 to be dewatered. A suitable adjustable gate or valve 14 controls the flow of feed material and forms an underflow weir opening 15. A box-to-belt flexible rubber seal 9 is also provided. Feed material 20 flows as a viscous slurry onto a first moving belt 21 passing opening 15. In some applications the feed material may be first flocculated with cationic or anionic coagulants such as organic polymers or lime or ferric chloride and the free water partially drained by a sieve bend or rotary drum concentrator (not shown) to remove some of the free liquid in the feed material. In the example shown, the belt then passes into a horizontal gravity drainage zone under which is a support grid, support rolls and a drainage tray 16 to collect filtrate. Plows (not shown) may be used in the gravity drainage zone of the belt to turn the partially drained slurry to expose clean belt surfaces and enhance the dewatering gravity draining. In a typical application in which 4% solids sewage sludge is the feed material, the sludge is drained in the gravity drainage zone to approximately 10% solids.

The drained slurry on belt 21 is conveyed by the belt to a drop zone 17 where the belt passes over and partially around belt direction-reversing roller 18. The drained slurry drops into a nip 19 formed by belt 21 as it leaves roller 18 and by a second belt 22 moving generally parallel to belt 21 at the nip. In accord with the invention an amendment 24 such as dry sawdust stored in amendment feed hopper 23 is free-fall mixed in the drop zone 17 with the drained feed material cascading off the belt 21. An inherent degree of mixing of partially dewatered feed material (slurry cake) and amendment occurs and the semi-dry amendment absorbs moisture away from the cake, immediately raising the percent solids of the original slurry solids (excluding amendment) from about 10% solids before amendment to about 15–20% solids with amendment. The actual % solids of the original slurry solids portion of the mixture depends on the material being dewatered, the % solids of the gravity-drained cake before amendment, the absorbing ability of the amendment, the amendment particle size, the amendment dosage and the mixing effected. The limit which the original slurry solids cake can reach by this wicking capillary action is the stoichiometric average % of solids of the mixture.

The resultant mixture of slurry cake and amendment is pressed together by the two belts to form a sandwich in the nip 19 and between the belts 21 and 22 as they progress in unison through the wedge zone 24A and then over a series of typical rollers 25, 26, 27, 28, 29 and 30. A stationary declining radius curved perforated slide plate surface (FIG. 2) may be provided as known in the art adjacent the nip to slowly increase dewatering pressure on the mixture between the belts. This provides a transition to so-called medium pressure S-rolls 25, 26, 27 and 28. Drain trays 31 are seen under these S-rolls for collection of press-drained liquid. Large roll 25 is normally a perforated roll. The perforations permit liquid, which is press expelled from the cake sandwiched between the belts to pass through interstices in the belts, and through the roll cylinder to enter into the roll interior for vacuum or gravity removal as is known in the art. A drain tray 61 is provided under roll 25. A series of high-pressure rolls 30, 32, 33, 34 and 35 are compressively engageable with the twin belts as they pass along the bottom hemisphere of roll 29 in this embodiment. Compression forces are applied to rolls 30, 32-35 by hydraulic cylinders (not shown). A filtrate drain tray 36 is provided under the high pressure rolls. Tension on the belts combined with the serpentine path around the decreasing diameter S-rolls 26-28 provides an increasing pressure and shear force on the captured cake and amendment mixture as liquid is removed.

After the last pressure roll 30 the belts separate and the resultant dewatered cake 40 is discharged to a bin or conveyor as indicated by arrow 41. Sewage sludge amended with sawdust in a 1:1 ratio dry solids basis would normally have a 35-40% solids content at its discharge from the belt press configuration shown in FIG. 1. Spring-loaded scrapers (not shown) may be used to deflect the cake away from the then diverging belts.

FIG. 2 illustrates in more detail the placement of amendment hopper 23 showing an adjustable amendment feeder gate or metering valve 50 and rotating feeder bar or auger 51. Other amendment feed devices may be employed. The position and outline of a curved slide plate 52 to increase pressure on the cake is also seen.

In FIG. 3 an auxiliary paddle-type rotary horizontal mixer 53 is provided in a mix zone or chamber 60 formed between curved baffle walls 54, 55. Wall 54 includes an upper scraper tip 56 for removing gravity-drained cake from the belt 21 as it passes around roll 18, and a lower curved end 57 which aids in directing and compacting the sludge-amendment mixture into a lower nip zone 58 between the belts downstream of the mixing zone 60. A perforated transition spiral wedge plate 59 or other effective pressure device for an initial stage of consolidation and dewatering is provided against belt 21 juxtaposed to the nip 58.

FIG. 5 is a perspective view of the paddle-wheel mixer 53, including paddles 53a, which is driven by shaft 49. It also shows a slot opening 23a extending across amendment hopper 23 which allows amendment to free fall or cascade into and across mixing zone 60. Belt 21 passes over roll 18 which is journalled in shaft 18a. A wide band of gravity-drain cake cascades off a moving segment 21a of the belt into the mixing chamber 60 and paddle mixer 53 where it is mixed with a similarly wide band of amendment free falling from the amendment hopper slot 23a.

FIG. 4 illustrates an embodiment where additional amendment 71 is added at a belt position downstream of the initial nip 19 such as between S-rolls 26 and 27. A curved smooth low friction belt-separating plate 62 is positioned laterally downstream of roll 26, or other roll dependent on the press design, to separate the belts. A smooth upper surface minimizes belt sliding wear against the plate. The plate creates a mixing chamber 69 between belts 21 and 22. Any cake 58a adhering to the underside of belt 22 above roll 26 is scraped off by an adjustable scraper 64 on one end of plate 62. The scraper may be mounted to ride about ⅛ inch off of the belt surface if this will still clean the belt properly. The scraper allows only minimal cake build-up on the slide plate. Further, this helps prevent uneven thicknesses of cake build-up on the spreader plate at any point across the width of the plate. Such uneven buildup would create unequal distances for belt travel which would cause mooning or biasing of the belts. A small slotted cross-pipe 66 with a feed auger or other amendment delivery system contained within the pipe, meters the desired amendment dosage through a slot 67 across the belt width. The amendment 71 free falls into the paddle blades of horizontal rotating ribbon mixer 63 to uniformly blend and mix the amendment with the cake 70 thereby allowing the amendment to effectively absorb excess liquid away from the cake solids. Mixer 63 may includes a pair of enmeshed paddle-tine or ribbon mixer blades. Plate 62 is mounted in a "down-swing" section of the belts (from roll 26 to a lower roll 27) so that the feeder can feed by gravity into the next roll as the belts come back together. Belt 22 is conveyed around a curved end 68 of fixed plate 62 over a slide surface thereon. The mixture of desorbed cake and amendment with absorbed moisture thereon is then captured between the again parallel belts at 72 as the belts traverse around roll 27. Drain trays 61, 31a and 31b are provided under the respective rolls 25, 26 and 27 to collect expressed liquid. A baffle 65 extending from plate 62 shelters discharging cake from contact with amendment feed pipe 66 to prevent plugging of slot 67.

FIG. 6 shows a perspective view of the mixing portion of the FIG. 4 apparatus taken inboard of the bottom half of the belt separating plate. Belt 22 slides over the top and depending exterior of plate 62. The fixed amendment feed pipe 66 allows amendment to free fall from along the width of slot 67 such that the amendment mixes with cake by the action of paddle-blade mixer 63. The mixed cake and amendment then falls onto belt 21 and nip 72 where as seen in FIG. 4 the mixture is conveyed to additional press sections as seen in FIG. 1.

The advantage of the mixing shown in FIGS. 4 and 6 is that the cake at this stage is even drier, so that the sawdust (amendment) dose has an even more dramatic effect on stabilization of the cake. The downstream nip rolls can be set at higher PLI to express even more moisture and/or a lower sawdust dose is required with less expected fines production and less belt blinding and/or a higher throughput rate can be achieved at higher belt speed without suffering squeezing cake out the sides. This is so since much less "free water" is present thus there is not sufficient medium present to carry fines in any substantial amount to the media surface.

FIG. 7 illustrates an embodiment of the invention including recycling of part of the cake/amendment mixture. Scrapers 81, 81a are provided at the normal discharge end of the press filter 80 to scrape dewatered cake/amendment mixture from belts 21 and 22. The falling mixture is captured from across the belts in trough 83 which contains an adjustable cake diverter horizontal screw 82 which covers from about 10% to about 75% of the belt discharge face to divert a portion of the cake/amendment mixture to waste through line 84 and another portion to a recycle trough 86. Repulping water is provided through line 85 into trough 86 to pulp the diverted dewatered mixture portion by operation of a paddle mixer 87. Repulped cake/amendment mixture exits the trough through line 89 into a metering/recycle pump 90, such as a progressing cavity pump driven by motor 91. The repulped mixture is then pumped through line 92 to a supplemental feed pipe 93 extending horizontally about the width of belt 21 from where the mixture is fed into a paddle mixer 94, both contained in a volume between belts 21, 22 formed by curved slide plate 95.

Displacement or leach washing of the cake/amendment mixture is provided by the above, after introduction of the recycled pulped mixture to the partially dewatered cake and amendment at that position. Other liquids may be added to the cake/amendment mixture by line 85 which, when mixed with the partially dewatered cake/amendment mixture, will effect a leach or wash displacement of the pregnant liquor remaining in the partially drained cake, when the cake is subjected to pressure by rollers downstream of the position of feed pipe 93.

The amendment used in the invention may be so-called bone dry sawdust, i.e. sawdust from, kiln dried wood with less than 10% moisture or sawdust from green wood or ground up tree clippings which may contain up to 50% moisture. In other cases ground or shredded waste paper, coarse incinerator fly ash, grain hulls, wood pulp, coal or peat fuels, shredded tires, diatomaceous earths, or wood shavings or other fibrous materials from almost any type of waste could be suitable amendment to improve rheology of the cake, to permit higher pressure to be exerted on the cake in order to extract more moisture.

The most effective particle size seems to be material passing a 4 mesh screen but contained on about 60 mesh screens.

Belts 21 and 22 are porous belts such as monofilament satin weave polyester or nylon, with air porosity ratings of 200–400 CFM.

The above description of embodiments of this invention is intended to be illustrative and not limiting. Other embodiments of this invention will be obvious to those skilled in the art in view of the above disclosure.

I claim:

1. A belt press cake dewatering device comprising a gravity drain zone deck of fixed width and fixed length, a first porous belt movably extending across said gravity drain zone deck from a first end to a second end thereof for forming partially dewatered cake on said first porous belt, a feed box adjacent said first end of said drain zone deck for introducing a slurry on said first porous belt, a second porous belt in proximity to said first belt at said second end of said drain zone deck, said first and second belts forming juxtaposed twin belts for receiving partially dewatered cake between said belts, said belts extending downstream of said drain zone around a series of press rollers to further dewater cake from said drain zone deck, said device further comprising:
   a feed hopper having a supply consisting essentially of a solid absorbent particulate slurry amendment therein;
   means extending above the juxtaposition of said first and second belts for gravity depositing a band of said slurry amendment from said hopper on and across said partially dewatered cake downstream of said second end of said drain zone deck at said juxtaposition of said first and second belts; and
   means for mixing said slurry amendment with said partially dewatered cake while said juxtaposed belts are receiving said partially dewatered cake to change the rheology and improve dewaterability of the resultant mixture thereof between said belts.

2. The device of claim 1 further comprising wedge means for compressing said resultant mixture between said belts downstream of said drain zone deck, and before said press rollers.

3. The device of claim 1 further comprising means for allowing partially dewatered cake to drop from said first belt and in which said slurry amendment-containing hopper includes an exit slot extending essentially across the width of said drain zone deck adjacent said second end of said drain zone deck and positioned to gravity feed slurry amendment from said hopper onto said partially dewatered cake as said partially dewatered cake drops from said first belt.

4. The device of claim 3 including a metering valve for controlling the feed rate of slurry amendment from said exit slot.

5. The device of claim 1 further comprising a means for mixing an additional amount of slurry amendment with said dewatered cake, said means for mixing being positioned downstream of at least a first of the series of press rollers and further dewatering said cake.

6. The device of claim 5 further comprising means for scraping furthered dewatered cake from said second belt downstream of the first of the series of press rollers;
   means for diverging said first belt from said second belt to form a mixing chamber downstream of said means for scraping; and
   means in said mixing chamber for feeding additional slurry amendment onto scraped further dewatered cake in said mixing chamber.

7. The device of claim 6 in which said means for feeding comprises an auger an d slotted feed tube extending transverse to and across the width of said first belt.

8. The device of claim 7 further comprising a paddle mixer in said mixing chamber for mixing said additionally slurry amendment exiting said feed tube with said scraped further dewatered cake.

9. The device of claim 6 wherein said means for scraping and said mixing chamber is upstream of a further one of said series of press rollers.

10. A belt press cake dewatering device comprising a gravity drain zone deck of fixed width and fixed length, a first porous belt movably extending across said gravity drain zone deck from a first end to a second end thereof for forming partially dewatered cake on said first porous belt, a feed box adjacent said first end of said drain zone deck for introducing a slurry on said first porous belt, a second porous belt in proximity to said first belt at said second end of said drain zone deck, said first and second belts forming juxtaposed twin belts for receiving partially dewatered cake between said belts, said belts extending downstream of said drain zone around a series of press rollers to further dewater cake from said drain zone deck, said device further comprising:
   a feed hopper having a supply of absorbent particulate slurry amendment therein;
   means for depositing a band of said slurry amendment from said hopper on and across said partially dewatered cake downstream of said second end of said drain zone deck at said juxtaposition of said first and second belts;
   means for mixing said slurry amendment with said partially dewatered cake to change the rheology and improve dewaterability of a resultant mixture thereof between said belts; and means for scraping said partially dewatered cake from said first porous belt, and first means for guiding said second belt, said means for scraping and said first means for guiding together forming a mixing chamber between said belts for mixing said slurry amendment and partially dewatered cake.

11. The device of claim 10 further including a paddle mixer in said mixing chamber, said mixer extending transverse to and across the width of said first belt, to mix said slurry amendment with said partially dewatered cake.

12. The device of claim 11 further comprising second means for guiding said second belt, downstream from said first means for guiding, into parallelism with said first belt to confine mixed dewatered cake and slurry amendment therebetween.

13. A method of dewatering a slurry in a filter having two porous belts, a gravity drain zone, and a series of belt press rollers downstream of said drain zone, comprising the steps of:
    (a) passing a first of said belts over said drain zone from a first end of said drain zone to a second end thereof;
    (b) feeding said slurry to said first of said belts at a position adjacent said drain zone first end, said belt carrying said slurry to said drain zone to initially gravity drain the slurry and form a partially dewatered cake on said first belt;
    (c) convergingly bringing a second of said belts into parallelism with said first belt;
    (d) feeding said partially dewatered cake into a nip formed between said converging belts;
    (e) feeding an amendment consisting essentially of a solid absorbent particulate material onto and mixing said particulate material into said partially dewatered cake as the partially dewatered cake is fed into said nip for further improving the dewaterability of said partially dewatered cake; and
    (f) pressing the resultant mixture of amendment and partially dewatered cake between said converged parallel belts to further dewater said partially dewatered cake and slurry.

14. The method of claim 13 further comprising dropping said partially dewatered cake off said first belt immediately downstream of said drain zone; and gravity feeding said amendment onto said partially dewatered cake as said partially dewatered cake is fed into said nip.

15. The method of claim 14 further comprising providing a paddle mixer for mixing said dropped partially dewatered cake and said gravity-fed amendment in a zone between said belts and above said nip.

16. The method of claim 13 further comprising recycling a portion of said further dewatered cake from step (f) to step (d).

17. The method of claim 13 further comprising leaching said cake between said belts downstream of said gravity drain zone with liquid-containing amendment such that liquid in said amendment displaces remaining pregnant liquor in said dewatered cake, thereby effecting improved overall recovery of the pregnant liquor by this leaching step.

18. The method of claim 13 in which said amendment comprises a fibrous absorbent dry material.

19. The method of claim 18 in which said amendment is sawdust having a particle range of from 4 to 60 mesh.

20. A method of dewatering a slurry in a filter having two porous belts, a gravity drain zone, and a series of belt press rollers downstream of said drain zone, comprising the steps of:
    (a) passing a first of said belts over said drain zone from a first end of said drain zone to a second end thereof;
    (b) feeding said slurry to said first of said belts at a position adjacent said drain zone first end, said belt carrying said slurry to said drain zone to initially gravity drain the slurry and form a partially dewatered cake on said first belt;
    (c) convergingly bringing a second of said belts into parallelism with said first belt;
    (d) feeding said partially dewatered cake into a nip formed between said converging belts;
    (e) feeding and mixing an absorbent particulate amendment onto and into said partially dewatered cake as the partially dewatered cake is fed into said nip for further improving the dewaterability of said partially dewatered cake; and
    (f) pressing the resultant mixture of amendment and partially dewatered cake between said converged parallel belts to further dewater said partially dewatered cake and slurry;
    (g) wherein pressing of said partially dewatered cake and amendment between said belts is by action of said press rollers to further dewater said dewatered cake;
    (h) diverging said belts from each other downstream of at least one of said press rollers to form a mixing zone between said belts;
    (i) mixing said further dewatered cake with additional amendment in said mixing zone; and
    (j) press rolling a resultant second mixture of said further dewatered cake and said additional amendment between said belts to further dewater said second mixture.

* * * * *